INVENTOR.
ALLAN R. CURLL, JR.
BY Victor R Beckman
ATTORNEY

SELECTIVE-FREQUENCY REMOTE CONTROL SYSTEM HAVING SPURIOUS NOISE SIGNAL SUPPRESSION

Filed June 6, 1961 2 Sheets-Sheet 2

INVENTOR.
ALLAN R. CURLL, JR.
BY Victor R Beckman
ATTORNEY

United States Patent Office 3,168,738

Patented Feb. 2, 1965

3,168,738

SELECTIVE-FREQUENCY REMOTE CONTROL SYSTEM HAVING SPURIOUS NOISE SIGNAL SUPPRESSION

Allan R. Curll, Jr., Ardmore, Pa., assignor, by mesne assignments, to Philco Corporation, Philadelphia, Pa., a corporation of Delaware Filed June 6, 1961, Ser. No. 115,225

7 Claims. (Cl. 343—228)

This invention relates to a remote control system and more particularly to a receiver construction for use in a wireless remote control system.

Wireless remote control systems are commonly used to control the operation of remotely located radio or television receivers or the like, thereby enabling the listener or viewer to adjust the tuning, volume, etc. from a location remote from the receiver. Such systems often comprise a compact hand-held control transmitter under control of an operator, which transmitter may be made to radiate control signals of different predetermined frequencies. A control receiver located at the remotely located radio or television receiver is adapted to receive such predetermined frequency signals from the control transmitter, with the receiver output functioning to control the remotely located apparatus in accordance with the frequency of such control signal.

The control transmitter and receiver may operate within any desired frequency range. Control signal waves in the ultrasonic frequency range are commonly used, as are radio frequency signal waves. Regardless of the frequency range employed, however, spurious noise signals within said range are often present. In the case of radio frequency controlled apparatus a spurious noise signal may be generated by the remotely located apparatus itself such as the television receiver. If, on the other hand, an ultrasonic control frequency is employed, the system is subject to spurious noises such as jangling of keys, coins, etc. It will be apparent that regardless of the frequency employed it is desired that the remote control receiver be protected from operation by such spurious noise signals. The control receiver of my invention incorporates a novel circuit arrangement for improved signal-to-noise ratio. Although the wireless remote control system as described hereinbelow operates within the ultrasonic frequency range, it will here be understood that the invention is applicable to control receivers operating in any frequency range, including radio frequency.

An object of this invention is the provision of means for increasing the signal-to-noise ratio in each channel of a remote control receiver, having at least two receiver channels, whenever a control signal is applied to the input of the receiver, thereby decreasing the vulnerability of the receiver to operation by spurious noise signals.

An object of this invention is the provision of a remote control receiver which is inexpensive to build and easily adjusted for proper operation.

An object of this invention is the provision of a remote control receiver which is substantially immune to undesired spurious noise signals.

An object of this invention is the provision of a remote control receiver having an improved signal-to-noise ratio as provided by an inexpensive limiter detector system.

These and other objects and advantages of the invention will become apparent from the following description when taken with the accompanying drawings. In the drawings, wherein like reference numerals refer to the same parts in different views.

Figure 1:
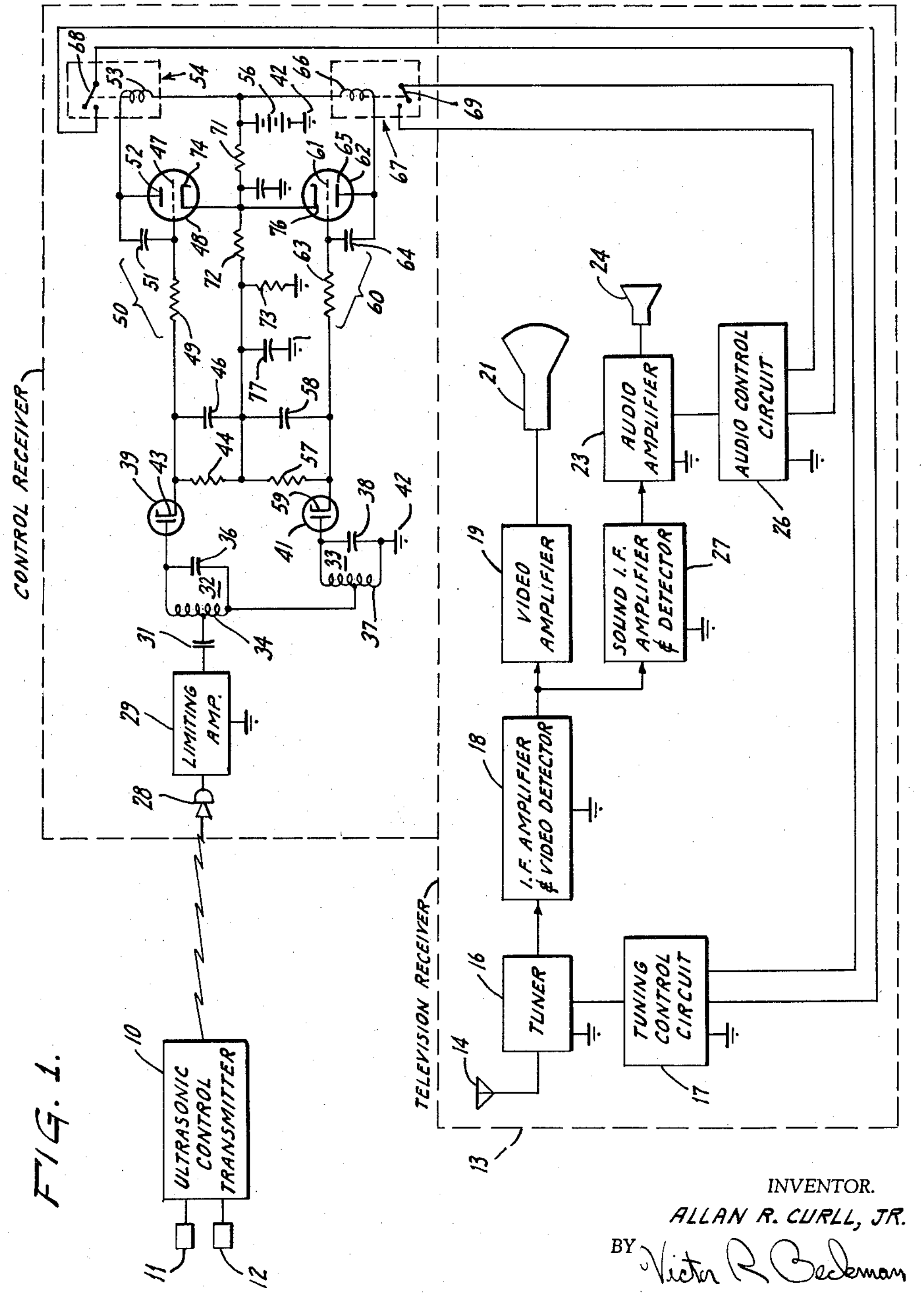
FIGURE 1 is a schematic circuit diagram, with portions in block form, showing a remote control system incorporating a control receiver made in accordance with this invention, the system being shown used for the control of a television receiver.

Reference is first made to FIGURE 1 of the drawings wherein there is shown a remote control system comprising a transmitter 10 adapted for operation at any one of two discrete frequencies within the ultrasonic frequency range. Such transmitters are well known in the prior art and may comprise a plurality of resonators which produce the desired remote control signals when struck with a hammer. The illustrated transmitter is capable of producing one of two discrete frequencies by manual depression of one of the control buttons 11 or 12. The control signal wave may have a frequency of 38 kc. or 40 kc. depending on which of the push-buttons 11 or 12 is depressed.

In the illustrated arrangement the remote control system is adapted for the control of a television receiver designated 13, which receiver includes an antenna 14 for reception of television signals. The television receiver may be of conventional design, including a tuner 16 to which the signals from the antenna 14 are fed. The tuner 16 may be stepped by means of a tuning control circuit 17 for selection of any one of a plurality of television channels. The tuning control circuit 17 may include a control motor for adjustment of movable tuning elements within the tuner 16 to effect the desired channel change. Tuners and tuning control circuits therefor are well known in the prior art and are not described in detail herein.

The television signal selected by the tuner 16 is heterodyned with a local oscillator signal within the tuner to provide a corresponding signal of intermediate frequency which is fed to the I.F. amplifier and video detector 18. The signal output from the video detector 18 comprises a composite video and sound signal, and the video signal therefrom is applied to a video amplifier 19 where the signal is amplified and thence fed to a picture tube 21. The sound signal from the detector 18 is fed to a sound I.F. amplifier and detector 27 from which the audio portion of the television signal is derived. The audio signal from the detector 27 is further amplified by an audio amplifier 23 and thence fed to a loudspeaker 24. The audio amplifier 23 may include a potentiometer, not shown, for control of the amplitude of the audio output therefrom, which potentiometer may be under control of an audio control circuit 26. The novel remote control receiver of my invention is used to provide a control signal to the tuning control circuit 17 and audio control circuit 26 for channel control and audio output control, respectively. It will here be understood that the apparatus of my invention is not limited to the control of tuning and audio circuits, the control of such circuits merely being shown for purposes of illustration.

The ultrasonic control signals from the control transmitter 10 are received by a signal receiving means comprising a microphone 28 included in the control receiver. The microphone output is fed to a limiting amplifier 29 of conventional design. The output from the limiting amplifier is fed through a coupling capacitor 31 to a pair of frequency responsive, or selective, circuits comprising tuned tank circuits 32 and 33. The tank circuit 32 comprises an inductor 34 and capacitor 36 tuned to the frequency of one of the ultrasonic control signals emitted by the transmitter 10, and the second tuned tank circuit 33 comprises an inductor 37 and capacitor 38 tuned to the frequency of the second ultrasonic control signal from the control transmitter 10. One end of the tank circuit 33 is connected to a common ground connection, designated 42.

The frequency responsive circuits 32 and 33 are connected to diode detectors 39 and 41, respectively, for the detection of the presence of control signals thereat. The cathode 43 of the diode 39 is connected to a shunt-connected resistor 44 and capacitor 46 comprising a load circuit for the diode 39. Signals detected by the diode 39 and developed across the load resistor 44 and capacitor 46 are fed through an integrator, designated 50, to the control grid 47 of an electron device comprising an amplifier tube 48. The integrator 50 comprises a series resistor 49 and the inter-electrode capacitance of the tube 48 together with a capacitor 51 connected between the control electrode, or grid, 47 and output electrode, or anode, 52 of the tube for increase of the Miller effect thereof. The anode 52 of the control tube 48 is connected through the control winding 53 of a control relay 54 actuatable between two operating conditions; the other end of the winding 53 being connected to the positive terminal of a D.-C. source of supply 56. The negative terminal of the D.-C. source of supply is connected to the common ground connection 42.

The load circuit for the diode 41 includes a shunt-connected resistor 57 and capacitor 58 having one end thereof connected to the diode cathode designated 59. Signals detected by the diode detector 41 and developed across the diode load circuit are fed through an integrator, designated 60, and applied to the control grid, or electrode, 61 of a second electron device comprising an amplifier tube 62. The integrator 65 connecting the diode detector 41 output to the tube 62 comprises a series resistor 63 and the inter-electrode capacitance of the tube 62 together with a capacitor 64 connected between the output electrode, or anode 66 of the tube 62 and the control grid 61 thereof. The anode 66 of the tube 62 is connected through a control winding 66 of a control relay 67 and to the positive terminal of the D.-C. source of supply 56. Relay contacts 68, 69 of the respective relays 64 and 67 are included in the tuning control circuit and audio control circuits 17 and 26 respectively for the control thereof in a manner well understood by those skilled in this art.

A voltage dividing network comprising series connected resistors 71, 72 and 73 is connected across the D.-C. source of supply 56. The junction between the resistors 71 and 72 is connected to the common electrodes, or cathodes 74 and 76 of the control tubes 48 and 62 respectively. The junction between the resistors 72 and 73 is connected to the one side of each of the load circuits comprising the shunt-connected resistor 44, capacitor 46 and the shunt-connected resistor 57 and capacitor 58. A filter capacitor 77 is connected between the junction between the resistors 72 and 73 and the common ground connection 42. It will be seen that the voltage drop across the resistor 72 controls the bias on the control tubes 48 and 62 respectively; the resistor 72 being connected between the cathodes of the control tubes and the control grids thereof through the load circuits of the diode detectors 39 and 41 and the integrators 50 and 60 connecting the load circuits to the tubes. The voltage drop across the resistor 73, on the other hand, controls the back-bias which is applied to the diode detectors 39 and 41, the connection to the cathodes of the diode detectors being through the respective load circuits thereof from the resistor 73. Since the resistors 72 and 73 are in the cathode circuit of the tubes 48 and 62 it will be apparent that the state of operation of the control tubes will affect the bias thereon and the back-bias on the detector diodes 39 and 41. That is, as the current through either electron device 48 or 62 increases, the back-bias on the diode detectors 39 and 41 increases due to the increased voltage drop across the resistor 73. Simultaneously, the increased current flow through the resistor 72 results in an increased bias on the control electrodes 47 and 61 of the tubes 48 and 62.

Figure 2A:
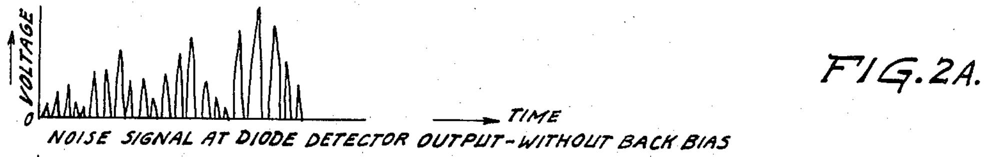
FIGURES 2A, 2B, 3A and 3B illustrate waveforms useful in the explanation of the apparatus shown in FIGURE 1.
Figure 2B:
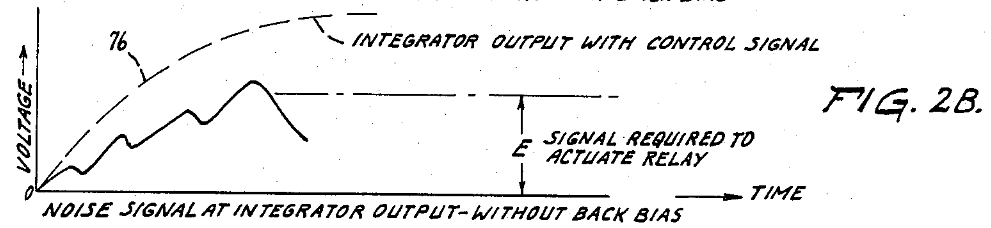
Figure 3A:
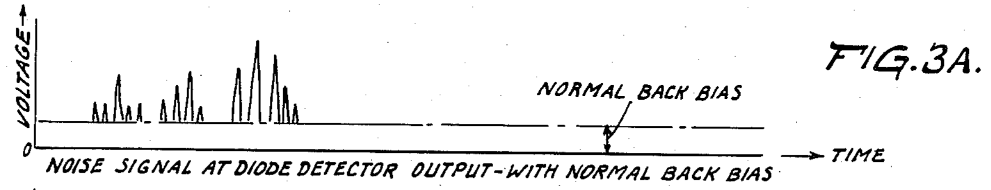
Figure 3B:
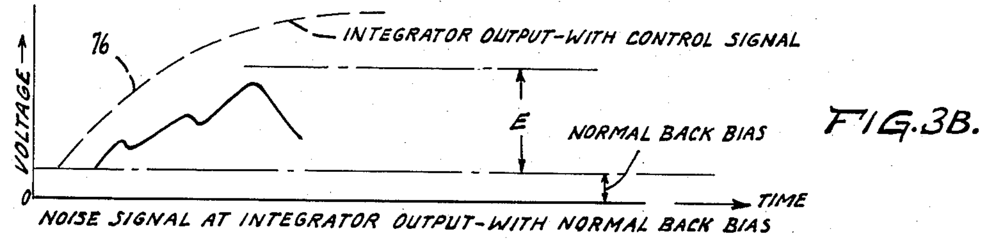

The effect of back-biasing diode detectors in remote control receivers may best be understood by an examination of the waveforms of FIGURES 2A through 4B. First, reference is made to FIGURES 2A and 2B wherein waveforms for a controlled receiver which does not employ a back-bias on the diode detectors are shown for purposes of explanation. In FIGURE 2A there is shown a noise signal at a diode detector output without back-bias on the diode. The noise signal is applied to an integrator, and the integrator output is shown in FIGURE 2B. With a persistent noise signal it will be seen that the integrator output can produce a sufficient voltage to provide sufficient current flow through a control tube to actuate a control relay. The signal necessary for such relay actuation being designated E in FIGURE 2B. Referring now to FIGURE 3A it will be noted that the same noise signal applied to a diode detector having a normal back-bias applied thereto produces an output from the diode only when the noise signal exceeds the back-bias. As seen in FIGURE 3B the noise signal as integrated may be reduced to a point where the actuation of the relay in the output circuit of the control tube is not effected. In the novel remote control receiver of my invention the bias designated normal back-bias is developed across the resistor 73 when no input signal is applied to the receiver.

In the operation of the controlled receiver embodying this invention an ultrasonic control signal from the control transmitter 10 received at the microphone 28 is amplified by the limiting amplifier 29 and fed through the coupling capacitor 31 to the tuned tank circuits 32 and 33. If the control signal is of the frequency of the tuned tank circuit 32 a control voltage is developed which is applied to the diode detector 39. The detected signal is developed across the shunt-connected resistor 44 and capacitor 46, and is then integrated by the integrator 50, with the integrator output being applied to the control grid 47 of the control tube 48. As the integrated output builds up on the integrating capacitor, the tube 48 increases in conduction. When the conduction of the tube 48 reaches a sufficiently high level the plate current through the control winding 53 of the relay 54 serves to actuate the relay and to close the relay contact 68. Since the tube current flows through the resistors 72 and 73, the voltage drop across such resistors increases as the tube conduction increases. Hence it will be seen that a variable bias is applied to the control tubes 48 and 62, and a variable back-bias is applied to the diode detectors 39 and 41, which biases increase with increased current flow through the tubes 48 and 62. The bias level on the tubes 48 and 62 will obviously set the level of integrated signal necessary to provide sufficient conduction of the tubes for actuation of the relays.

Figure 4A:
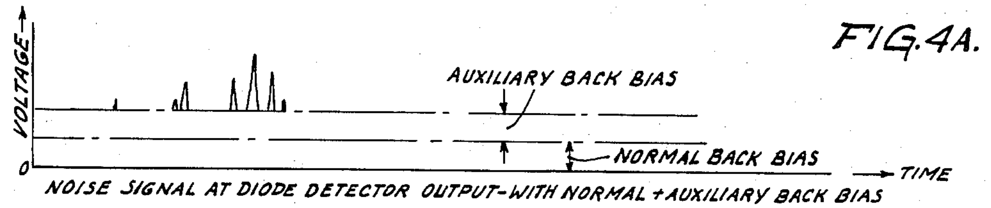
FIGURES 4A and 4B are similar to FIGURES 3A and 3B only showing waveforms at various points in the circuit of FIGURE 1.
Figure 4B:
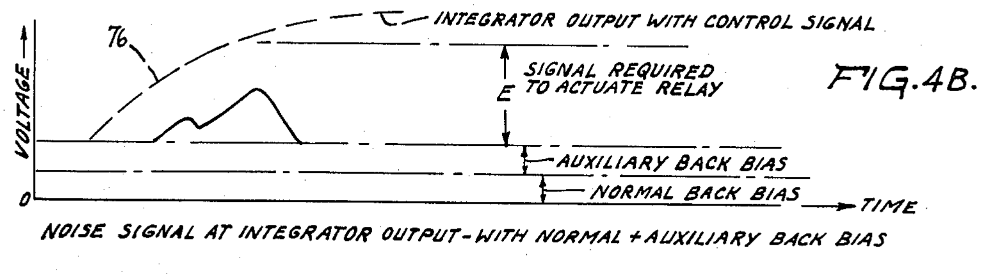

The effect of a variable back-bias on the diode detectors 39 and 41 will best be understood upon examination of FIGURES 4A and 4B, to which figures reference is now made. In FIGURE 4A the additional back-bias developed by increased current flow through a control tube, with a resultant increased voltage drop across the resistor 73, is designated an "auxiliary" back-bias. The diode detectors will not conduct until the signal applied thereto overcomes the normal back-bias plus the variable auxiliary back-bias. The advantages of increasing the back-bias on the diode detectors as a function of control tube current flow will best be seen upon examination of the waveforms of FIGURE 4B. As seen in FIGURE 4B, with an increased back-bias on the diode detectors, only a relatively small portion of the noise signal passes the diode detector which noise signal is integrated and hence applied to the control tube. The waveform of an integrator output produced by the application of a control signal to the device is shown in broken lines in FIGURES 2B, 3B and 4B, and is designated 76 in such figures. In comparing FIGURES 2B, 3B and 4B, it will be seen that the signal-to-noise ratio of the receiver increases with an increase in the back-bias on the diode detectors. Thus, with my novel circuit arrangement a variable signal-to-noise ratio is obtained, with the signal-to-noise ratio increasing with increased current flow through the control tubes. The maximum signal-to-noise ratio obtains when one channel of the receiver is energized by a control signal. Noise protection is thereby greatest at a time when the greatest protection is necessary, i.e., when a control signal is applied thereto.

The invention having been described in detail in accordance with the requirements of the patent statutes, various changes and modifications will suggest themselves to those skilled in this art. It is intended that such changes and modifications shall fall within the scope of the patent as recited in the following claims.

I claim:

1. A remote control receiver responsive to any one of a plurality of transmitted control signals of different frequency and comprising, signal receiving means responsive to control signals of different frequencies, frequency selective circuits coupled to the said signal receiving means and operable to produce control voltages in response to signals of the frequency to which the frequency selective circuits are tuned, control circuits, diode detectors individually coupling the said frequency selective circuits to the said control circuits, a source of back-bias potential connected to the said diode detectors and back-biasing the same, and means responsive to current flow in the control circuit controlling the said back-bias potential on the said diode detectors in accordance with the magnitude of the flow of current in the said control circuits, the said back-bias on the diode detectors increasing with increased current flow in the said control circuits.

2. The invention as recited in claim 1 wherein the said control circuits each include an electron device, a source of bias potential connected to the said electron devices, and means controlling the bias potential on the said electron devices in accordance with the magnitude of the current flow through the said electron devices.

3. The invention as recited in claim 1 including integrators individually coupling the said diode detectors to the said control circuits.

4. A remote control receiver responsive to any one of a plurality of transmitted control signals of different frequency for selectively controlling the operation of controlled apparatus and comprising, signal receiving means responsive to control signals of different frequencies, frequency responsive circuits coupled to the said signal receiving means and operable to produce control voltages in response to signals of the frequency to which the frequency selective circuits are tuned, control circuits each of which includes an electron device, diode detectors individually coupling the said frequency selective circuits to the said electron devices in the control circuits, a source of bias potential connected to the said diode detectors and to the electron devices for back-biasing the said diode detectors and biasing the said electron devices, and means responsive to current flow in the control circuit simultaneously controlling the back-bias on the diode detectors and the bias on the electron devices in accordance with the magnitude of the flow of current through the said electron devices, the said back-bias in the diode detectors and the bias on the electron devices simultaneously increasing with increased current flow through the said electron devices.

5. The invention as recited in claim 4 including integrators individually coupling the said diode detectors to the said electron devices.

6. A remote control receiver responsive to any one of a plurality of transmitted control signals of different frequency for selectively controlling the operation of a television receiving system and comprising, signal receiving means at the television receiver responsive to control signals of different frequencies, a plurality of frequency responsive circuits coupled to the said signal receiving means and selectively operable to produce control voltages in response to signals of the frequency to which the frequency selective circuits are tuned, a plurality of diode detectors individually coupled to the said frequency responsive circuits, a plurality of electron devices each having control, output and common electrodes, a plurality of means actuatable between at least two operating conditions and individually connected to the output electrodes of the said electron devices, a plurality of integrators individually coupling the said diode detectors to the said control electrodes of the said electron devices, a source of bias potential, a voltage dividing network including a plurality of connected resistors connected across the said source of bias potential, means connecting the common electrodes of said electron devices together and to one point on the voltage dividing network, detector load means connecting the said diode detectors to a second point on the voltage dividing network, the voltage drop across one of the resistors in the voltage dividing network being applied as a back-bias to the said diode detectors, and the voltage drop across another resistor of the voltage dividing network being applied as a bias between the control and common electrodes of the said electron devices, the current through the said one and another resistors of the voltage dividing network being dependent upon the total current flow through the said electron devices.

7. A remote control receiver responsive to any one of a plurality of transmitter control signals of different frequency and comprising, signal receiving means responsive to control signals of different frequencies, frequency selective circuits coupled to the said signal receiving means and selectively operable to produce control voltages in response to signals of the frequency to which the frequency selective circuits are tuned, a plurality of diode detectors individually coupled to the said frequency responsive circuits, a plurality of electron devices each having control, output and common electrodes, means connecting the said diode detectors to the said control electrodes of the said electron devices, a plurality of means actuatable between at least two operating conditions and individually connected to the said electron devices, a source of bias potential, a voltage dividing network including a plurality of connected resistors connected across the said source of bias potential, means connecting the common electrodes of said electron devices together and to one point on the voltage dividing network, detector load means connecting the said diode detectors to a second point on the voltage dividing network, the voltage drop across one of the resistors in the voltage dividing network being applied as a back-bias to the said diode detectors, and the voltage drop across another resistor of the voltage dividing network being applied as a bias between the control and common electrodes of the said electron devices, the current through the said one and another resistors of the voltage dividing network being dependent upon the total current flow through the said electron devices.

References Cited in the file of this patent

UNITED STATES PATENTS

| | | |
|---|---|---|
| 2,349,881 | Peterson | May 30, 1944 |
| 2,423,225 | Chapin | July 1, 1947 |
| 2,985,754 | Grieg et al. | May 23, 1961 |
| 2,996,681 | Marks | Aug. 15, 1961 |